(12) United States Patent  
Jordan et al.

(10) Patent No.: US 8,527,906 B2  
(45) Date of Patent: Sep. 3, 2013

(54) SYSTEMS AND METHODS FOR IMMERSIVE ADVERTISING

(75) Inventors: Connie Jordan, Laguna Hills, CA (US); Christopher Carmichael, Laguna Hills, CA (US); Gregory Crotty, Morris Plains, NJ (US)

(73) Assignee: Ubiquity Broadcasting Corporation, Irvine, CA (US)

( * ) Notice: Subject to any disclaimer, the term of this patent is extended or adjusted under 35 U.S.C. 154(b) by 668 days.

(21) Appl. No.: 12/397,350

(22) Filed: Mar. 4, 2009

(65) Prior Publication Data

US 2009/0228829 A1 Sep. 10, 2009

Related U.S. Application Data

(63) Continuation of application No. 12/206,653, filed on Sep. 8, 2008, which is a continuation of application No. 09/638,304, filed on Aug. 14, 2000, now Pat. No. 7,464,344.

(51) Int. Cl.  
*G06F 15/00* (2006.01)  
*G06F 13/00* (2006.01)

(52) U.S. Cl.  
USPC .................................... 715/854; 715/747

(58) Field of Classification Search  
USPC .............. 715/719, 800, 849, 851, 854, 848, 715/744–747, 720, 723, 763–765  
See application file for complete search history.

(56) References Cited

U.S. PATENT DOCUMENTS

| 2002/0026388 A1* | 2/2002 | Roebuck | 705/27 |
| 2011/0041095 A1* | 2/2011 | Reed | 715/834 |

* cited by examiner

*Primary Examiner* — Cao Nguyen  
(74) *Attorney, Agent, or Firm* — Law Office of Scott C. Harris, Inc.

(57) ABSTRACT

The invention is directed to systems and Methods for immersive advertising on a wide area network, such as the Internet or World Wide Web. Immersive advertisements are customized presentations developed and imbedded within the body of web content. They can take the form of non-static images imbedded within a configurable primary image model or they can be a non-configurable, highly stylized, and animated component imbedded within the content of a web page.

30 Claims, 11 Drawing Sheets

SYSTEMS AND METHODS FOR IMMERSIVE ADVERTISING

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is directed to improved systems and methods for advertising and, in particular, to improved systems and methods for immersive advertising on a wide area computer network such as the Internet or World Wide Web.

BACKGROUND OF THE INVENTION

The substantial deployment of fiber optics by telephone and cable television companies has created an infrastructure capable of transmitting billions of bits of data per second through these networks. Advancements in digital video compression technologies further make it practical to digitize and send high-quality full motion video in addition to audio, text and graphics over these networks.

The confluence of digital signal processing, microelectronics and electro-optic technologies will permit the deployment of interactive switched digital broadband networks and the distribution of two-way, real-time, interactive programming and services. As the cost of data storage and processing is reduced, these networks will become increasingly cost effective, providing unlimited opportunities for businesses to develop new products and services and to deliver their current offerings more efficiently.

As the Internet has emerged into a global marketplace over the past decade, numerous companies have attempted to advertise and sell their respective products using the Internet and, in particular, the World Wide Web. This marketing usually falls into one of two categories, either placing "banner advertisements" on a particular web page or using an entire web page or web site as an advertisement.

A banner ad is a small advertisement placed on, but discrete from the content of, a web page. Typically, these ads are clickable, meaning they provide a hypertext link to the page being advertised. Banner ads are advantageous because they can be placed on web pages with a large number of visitors or on web pages with a particular type of visitor. However, banner ads are typically static and unsophisticated and, thus, go unnoticed. Additionally, when noticed, banner ads are often seen as disruptive and unwanted because they are not integrated with the web page content.

The second category of advertising includes web pages or even entire web sites that serve as advertisements. An example of this type of online advertising is the catalog web site. These sites are very similar to an actual catalog, offering pictures, descriptions and prices for the goods or services along with a means for purchasing the goods or services. While this type of advertising offers the advantage of focusing the visitor's attention on the advertising content, the sites are usually only accessed by visitors intentionally looking for specific information about the goods or services advertised on the web page. Thus, the number of visitors tends to be low, and these visitors are rarely potential new customers. Instead, the web site merely services existing customers.

Therefore, a strong need exists for a method of advertising that can be integrated with the content of a high traffic web site without being intrusive and that can increase sales by attracting new potential customers. A further need exists for methods of online advertising that involve the consumer and that require real-time consumer input and interaction, therefore enhancing the user's experience with the product or service being advertised.

SUMMARY OF THE INVENTION

Immersive advertisements are customized presentations developed and embedded within the body of web content. Rather than distracting a user when the user visits a web site, this form of advertising actually enhances the imagery presented to the user and provides him or her with information and entertainment. Furthermore, the methods and systems described herein enable the user to experience a more intimate and personal connection with the product or service, because the user is involved in customizing the product or service as well as the ad showcasing the product or service. Moreover, the methods and systems described herein enable the user to direct and interact with the advertisement in real-time.

In a preferred embodiment, an immersive advertisement can take the form of non-static images embedded within a primary image model. The non-static images preferably comprise professionally directed and produced presentations, which may be created using multimedia technologies known to those skilled in the art. Additionally, these non-static images may be configurable by a visitor to the web page.

In another preferred embodiment, an immersive advertisement can be a highly stylized, animated component embedded within the content of a web page. In this embodiment, the immersive advertisement would preferably blend into the presentation in a manner that is graphically appropriate.

In yet another preferred embodiment, an immersive advertisement is displayed as a static image in a compilation of images concentrated within a web page. Rather than being discrete, banner type ads, static immersive advertisements are focused on, and blend with, the overall experience or feel of the web site.

In another preferred embodiment, a system for performing immersive advertising may include an advertising sequence, an image database, a graphical user interface (GUI), a presentation web page, an application server and a logic program. The advertising sequence is stored in a memory and includes a plurality of single frame primary image models. These single frame primary image models may be created using numerous available technologies, such as video, film, or still frame photography. The image database contains a plurality of fill images, which can include still frame images or dynamically altered components of the single frame primary image models. The logic program provides a means for a user, via the GUI, to configure the advertising sequence using the image database, wherein the user may select fill images to be displayed within single frame primary image models. The resulting advertising sequence may then be displayed at the presentation web page.

In a preferred method of immersive advertising, which may take place on a wide area computer network such as the Internet or the World Wide Web, an advertising sequence is stored in memory. This advertising sequence includes a plurality of single frame primary image models and a plurality of fill images that are configurable within the primary image models. A GUI is provided, which may be a web page that allows a user to selectively configure the fill images within the primary image models. In so doing, the advertising sequence may be customized based upon the user's selective configuration. The advertising sequence may then be displayed on a presentation web page.

In yet another preferred embodiment, a method for advertising products and services over a global computer network is presented. This method involves the use of a networked computer and comprises the step of providing an interactive video clip and delivering it electronically to a consumer terminal. The video clip can comprise three-dimensional data stored in the networked computer and accessible by a remote user.

Further steps include providing a graphical user interface that enables the remote consumer/user to interact with the video clip in real-time. The graphical user interface can enable the user's keyboard or joystick or other input device to start, stop, speed up, slow down, change the perspective of, alter the characters or products used in, or alter the scenery involved in an interactive advertisement. The video clip can comprise digitized video-taped or filmed images as well as computer generated or hand drawn and digitized images displayed in rapid sequence frames.

Another step involved in this method is to provide a searchable database of products and services, and to enable the consumer to mix and match products and services by choosing different products and services from the database. This method allows the consumer to dynamically create a customized advertisement, which can be delivered in an interactive setting.

For example, the consumer may be viewing a static advertisement of a Ferrari (Registered Trademark of Ferrari North America or Ferrari S.P.A.). The consumer can load the Ferrari with accessories chosen by the consumer, such as a Sony (Registered Trademark of Sony Corp.) stereo system and Eagle GT (Trademark of Goodyear Tire and Rubber Co.) tires. The consumer can then get into the car and drive it in a virtual environment, which can comprise video images, computer generated images, or a combination of both. The virtual environments can be computer generated images configured with three-dimensional data or digitized video or film shot with 3-D technology. Furthermore, the virtual environment can be created using systems known in the art, which include three-dimensional data, point of view position data, and operable objects controlled by a logic program.

In conjunction with any of the above or any other embodiments or methods of the invention, Virtual Reality Markup Language (VRML) can be used to present full 360 degree images of a selected product. This allows the product to be viewed from all angles and also allows the user to move any "hinged" or otherwise movable components of the product to demonstrate its function.

Furthermore, the product, for example, a new dental drill, can be demonstrated in a three dimensional immersive advertisement that enables a remote user/consumer to handle the virtual drill and use it on a virtual patient in a virtual operation. The perspective of the user/consumer in the three dimensional virtual space can be from the point of view of the virtual dentist conducting the operation. The virtual dentist can be controlled by the user/consumer using methods and systems, such as those described in U.S. Pat. No. 5,973,704 (the entirety of which is incorporated herein by reference). Furthermore, the point of view of the user/consumer can be from a third position in the virtual three dimensional space, so that the user is not only controlling the actions of the virtual dentist, but is viewing the action as a third virtual person.

Also, a Product and Service Descriptor Module can be provided to display the product and all information available including pricing. This module comprises a database of products and services and their specifications. It allows the user to obtain detailed information about the specifications of any product or service included in the database.

DETAILED DESCRIPTION OF THE PREFERRED EMBODIMENTS

Figure 1:
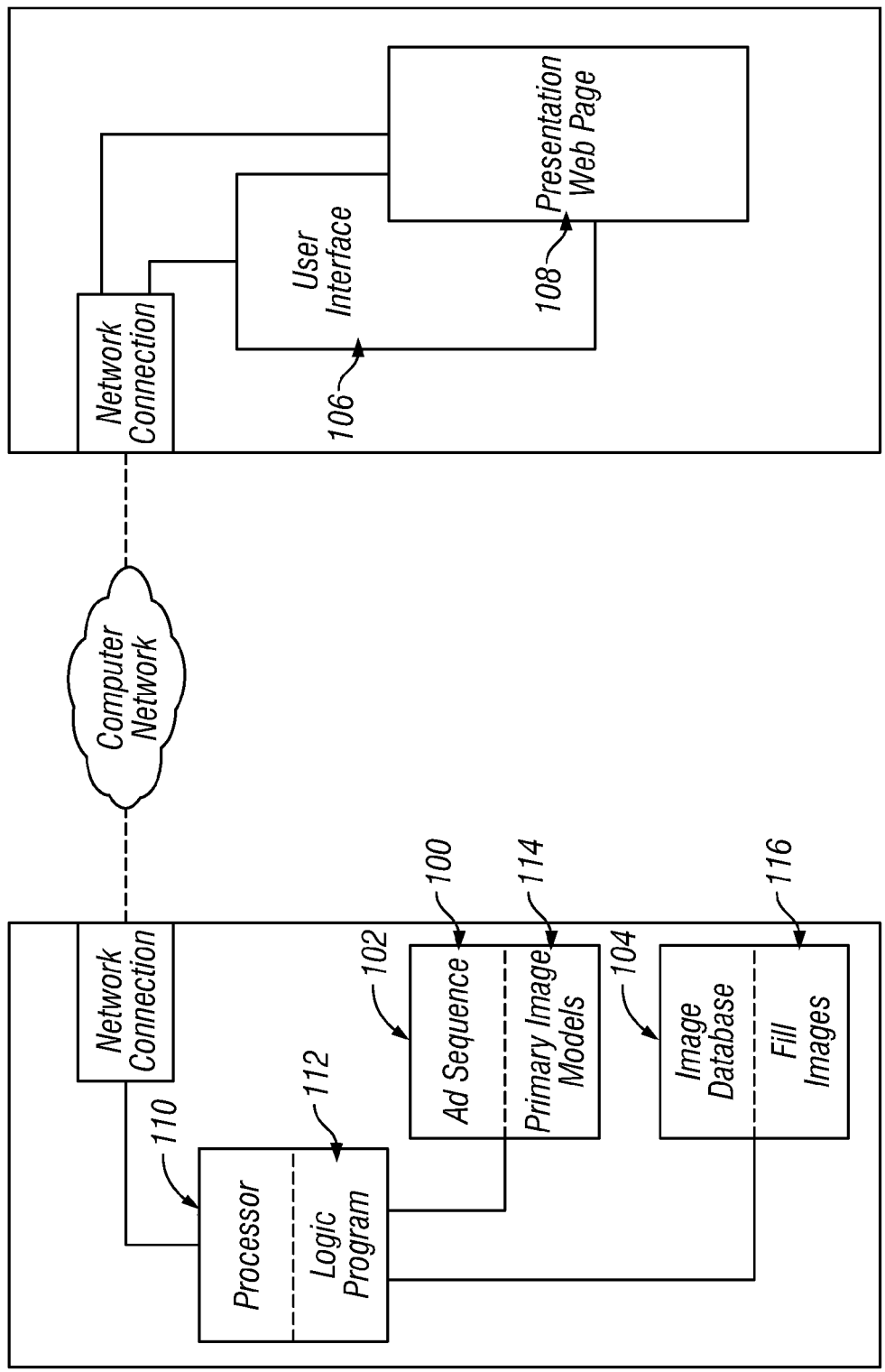
FIG. 1 illustrates the general architecture of a system for performing immersive advertising in accordance with the present invention.

FIG. 1 illustrates the general architecture of a system for performing Immersive advertising in accordance with the present invention. This system may include an advertising sequence 100 stored in a memory 102, an image database 104, a user interface 106, a presentation web page 108, and processor 110 adapted to perform a logic program 112. An application server is in electronic communication with each of the user interface, the memory, and the image database. The advertising sequence includes a plurality of single frame primary image models 114. These single frame primary image models may be created using numerous available technologies, such as video, film, still frame photography, or computer generated imaging (CGI).

The photography sequence is then broken down into single frames for manipulation. It is these single frame images that will comprise the primary image models that serve as the base for the presentation. Within the body of a primary image model, various components such as clothing or background images are manually lifted (removed) from the photograph. This may be accomplished using graphic editing software commonly known to those skilled in the art.

A user can then use the fill images to configure the resulting blank components. The image database contains a plurality of fill images 116, which can include still frame images or dynamically altered components of the single frame primary image models. The logic program 112 provides a means for a user, via the user interface 106, to configure the advertising sequence 100 using the image database 104, wherein the user may select fill images 116 to be displayed within single frame primary image models 114. The single frames are then reassembled and the resulting advertising sequence is displayed at the presentation web page 108. Common applications such as Macromedia's Flash technology or JAVA will be used to present the final stored image on screen. Also, Virtual Reality Markup Language (VRML) can be used to present full 360 degree images of a selected product. This allows the product to be viewed from all angles and also allows the user to move any "hinged" or otherwise movable components of the product to demonstrate its function. The Product and Service Descriptor Module is the component that will display the product and all information available including pricing.

Figure 2:
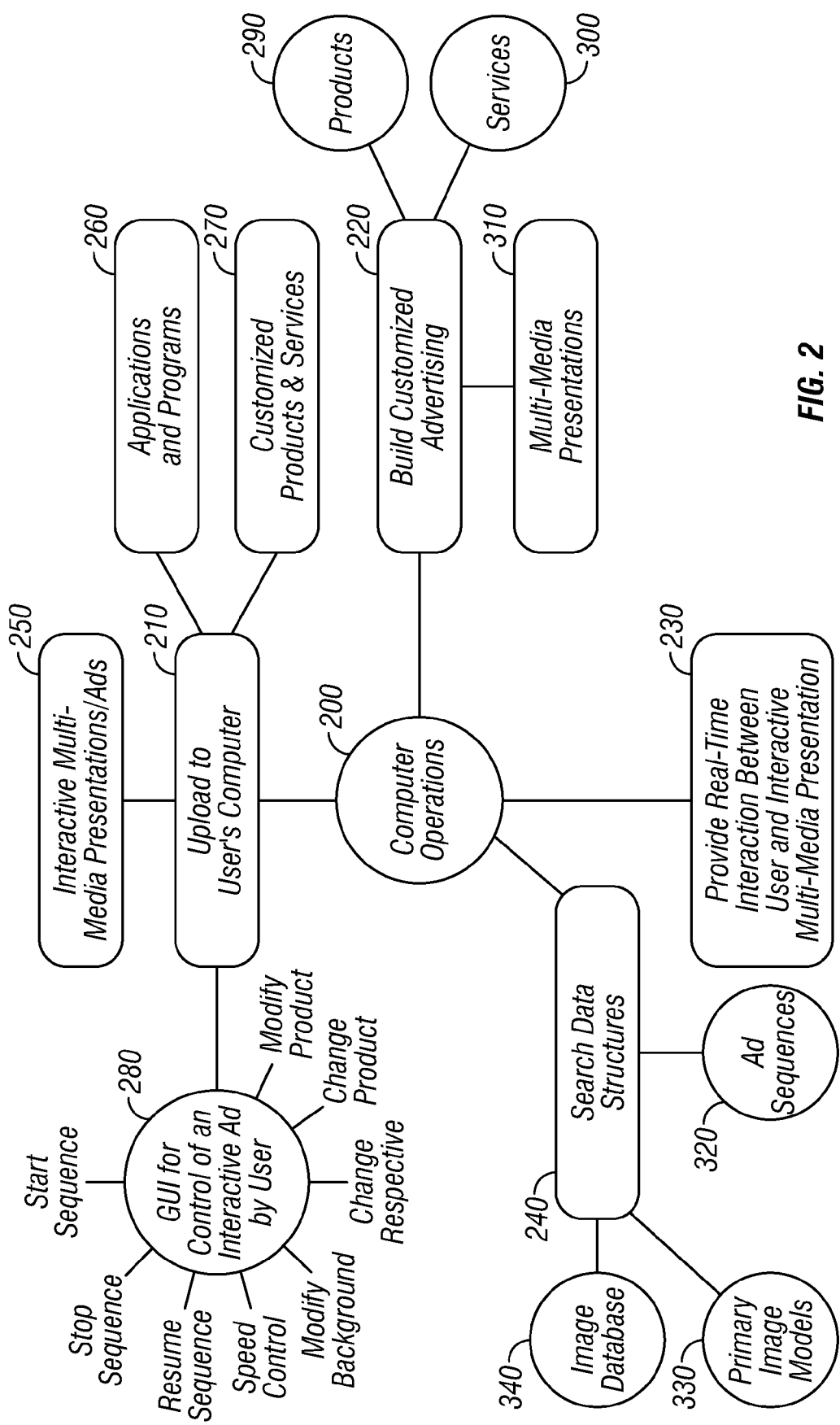
FIG. 2 is a state diagram illustrating an example of operations performed by a computer running software according to one embodiment of the invention.

FIG. 2 illustrates an example of operations performed by a computer running software that enables users/consumers to customize advertising and to view it in an interactive setting. The overall operation 200 of the computer includes: an upload operation 210; a build customized advertising operation 220; a real-time interaction operation 230; and a search data structures operation 240.

The upload operation 210 can upload interactive multimedia presentations 250, other applications and programs 260, customized products and services that are advertised 270, and a graphical user interface 280 that enables a user/consumer to control the interactive advertising 250. The graphical user interface can include the following functions among others: a start sequence function; a stop sequence function; a resume sequence function; a speed control; a modify background function to change the background of the presentation; a change perspective function, which allows the user to view the presentation from a plurality of perspectives; a change product function, which allows the user to introduce different products to the presentation; and a modify product function, which allows the user to modify certain qualities or characteristics of a particular product, such as its color, or other specifications, during the presentation.

The build customized advertising operation 220 draws from various databases of products 290, services 300, and multi-media presentations or advertising sequences 310 to build a visual depiction of a product or service or a multi-media presentation showcasing one or more products or services.

The search data structures operation 240 can search an image database 340, which holds a plurality of images of products, with numerous colors and specifications of any particular product being represented in the database. The search data structures operation 240 can also search primary image models 330, which include outlines or generic iterations, i.e., models of different products. The search data structures operation 240 can further search advertising sequences 320, which can be a sequence of frames that showcase a primary model 330 or a plurality of primary models.

Figure 3:
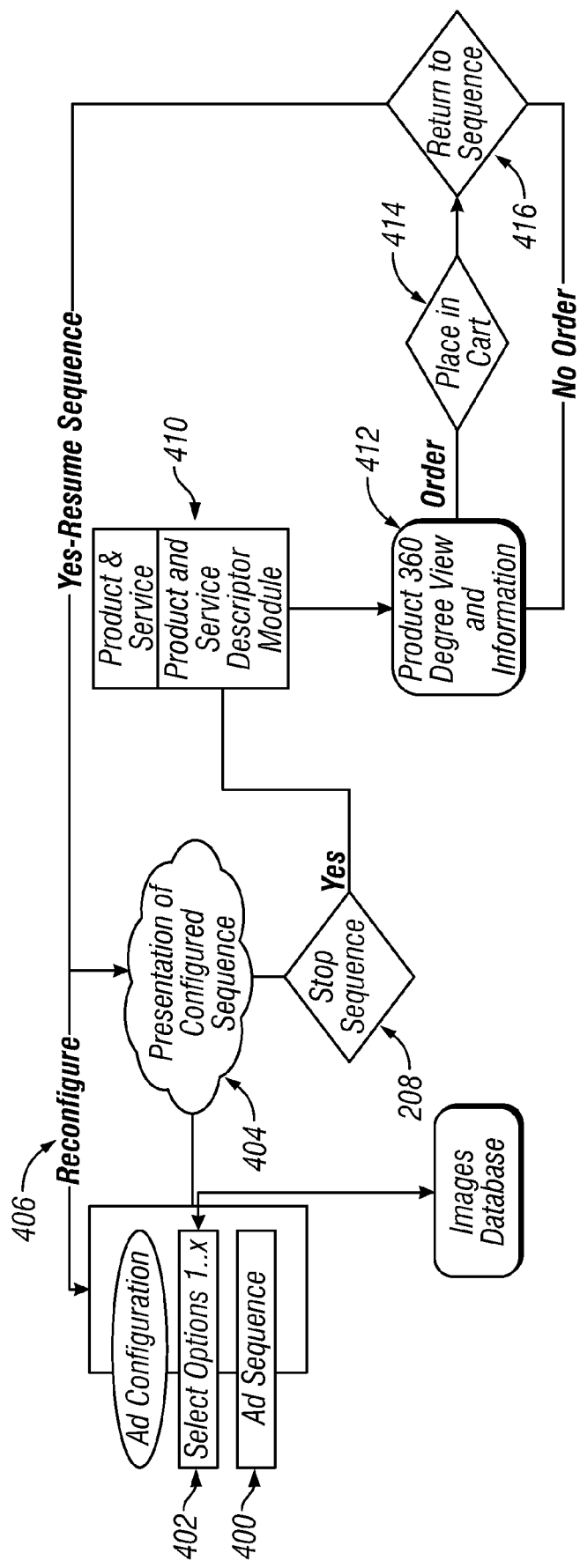
FIG. 3 illustrates a preferred method of configurable immersive-advertising in accordance with the present invention.

FIG. 3 illustrates a preferred method of Immersive advertising according to the present invention. The method may take place on a wide area computer network such as the Internet or the World Wide Web and includes storing an advertising sequence in memory, step 400. This advertising sequence includes a plurality of single frame primary image models and a plurality of fill images that are configurable within the primary image models. A user interface is provided, which interface may be a web page or a specially designed interface application program that allows a user to selectively configure the fill images within the primary image models, step 402. In so doing, the advertising sequence may be customized based upon the user's selective configuration. The advertising sequence may then be displayed on a presentation web page, step 404. A user may then either reconfigure the advertising sequence, step 406, or stop the advertising sequence, step 408. A Product and Service Descriptor Module will then provide more detailed information about the products and services advertised, step 410.

An optional 360 degree view of the primary image model may also be provided, step 412. A user may then select the product or service for purchase, step 414, and, if desired, begin the process again, step 416.

Figure 4:
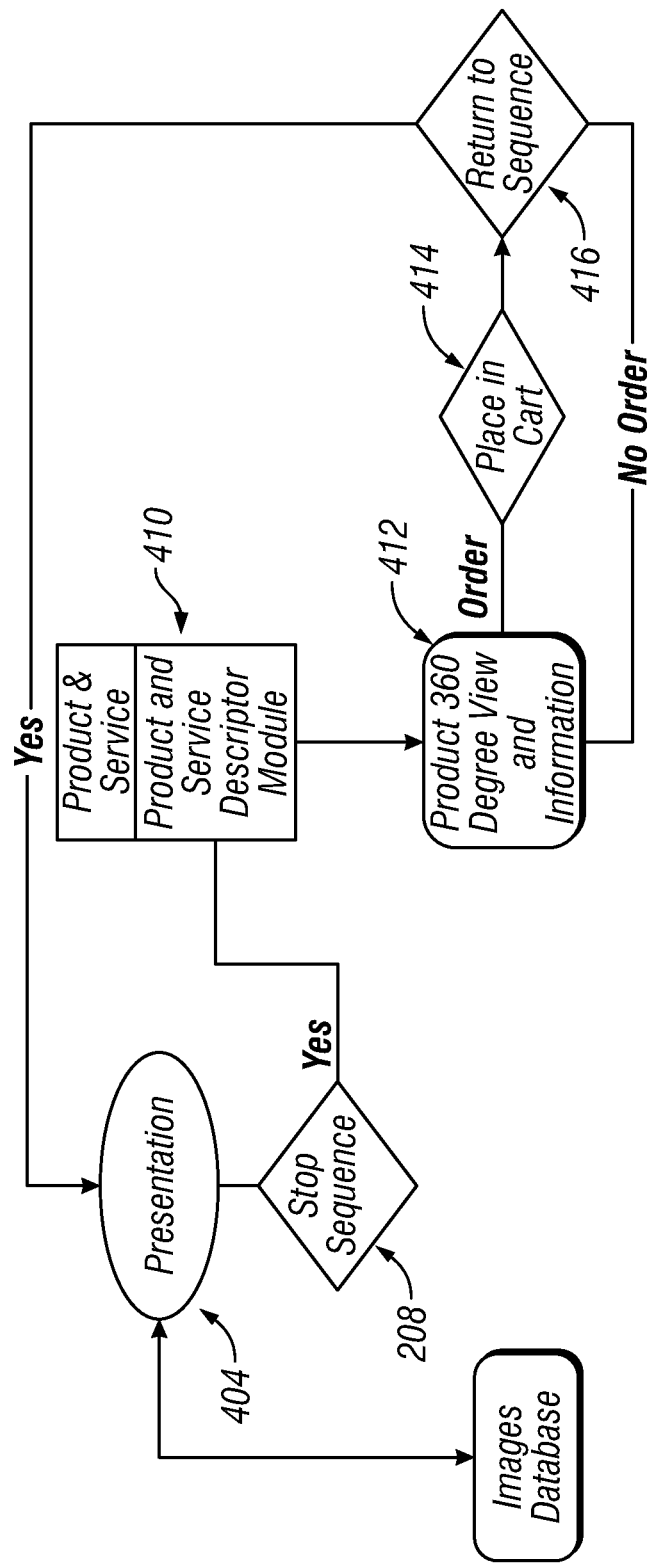
FIG. 4 illustrates a preferred method of non-configurable immersive advertising in accordance with the present invention.

FIG. 4 illustrates an alternate preferred method of Immersive advertising. In FIG. 3, a non-configurable method of Immersive advertising is shown, and otherwise, like numbers refer to like aspects of the present invention.

FIGS. 5A-5D and 6A-6E are successive screen displays further illustrating Immersive advertising in accordance with the present invention. Many alternative formats to the Immersive advertising invention are possible and FIGS. 5A-6E are only representative examples. As shown, Immersive advertising allows a user to select (or enter) various preferences regarding featured products or services. These preferences include not only broad selections such as category of product or service but also more specific preferences such as specific brands within the category, specific models of a particular brand, and even specific colors or other fine details of a particular model. Once all of these selections are made, an advertising sequence customized for the user is displayed. This display can include a 360 degree view of the product or of specific aspects of the product.

Figure 5A:
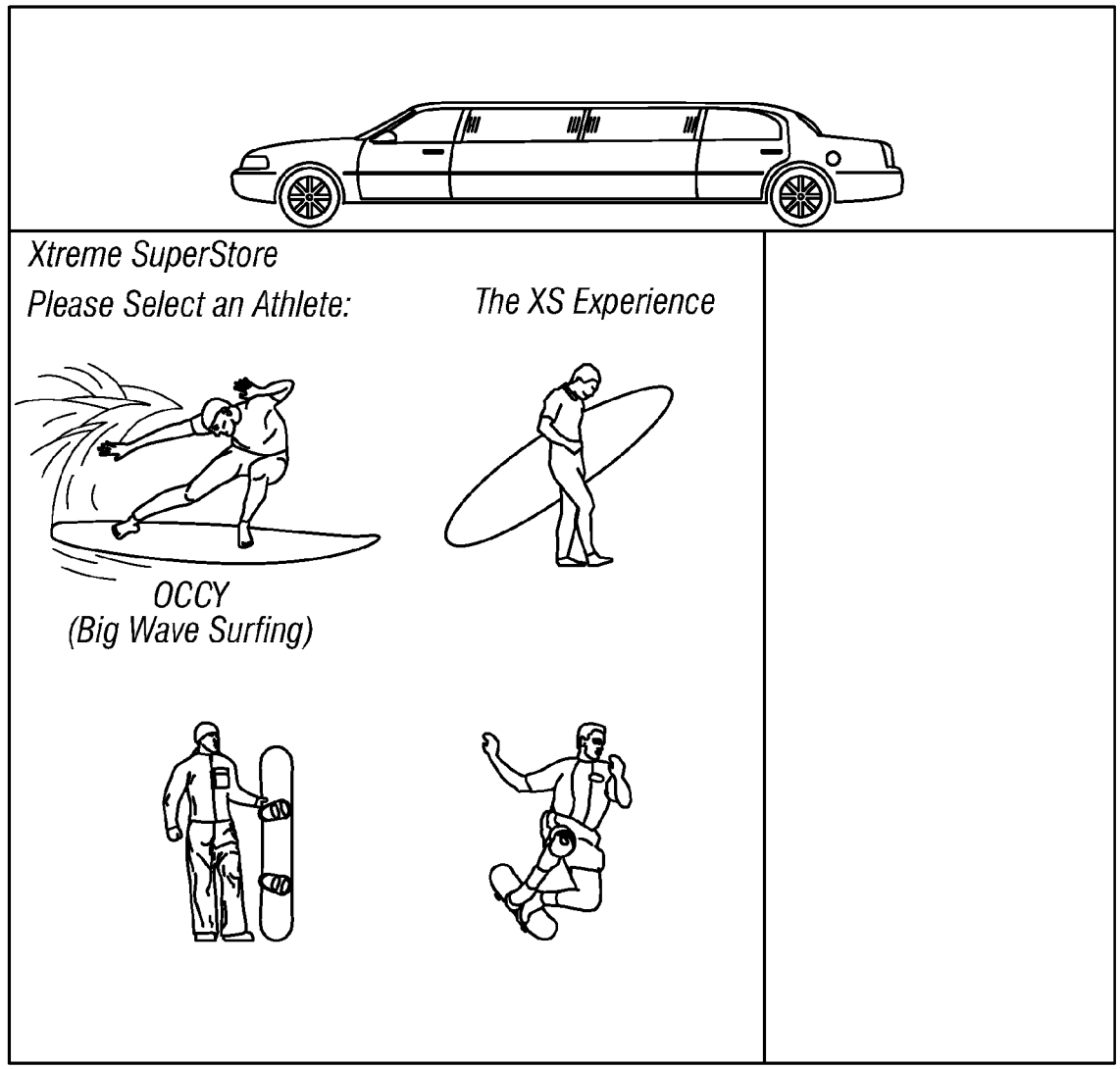
FIG. 5A is a screen display illustrating a user interface web page for selecting a configurable primary image model.
Figure 5B:
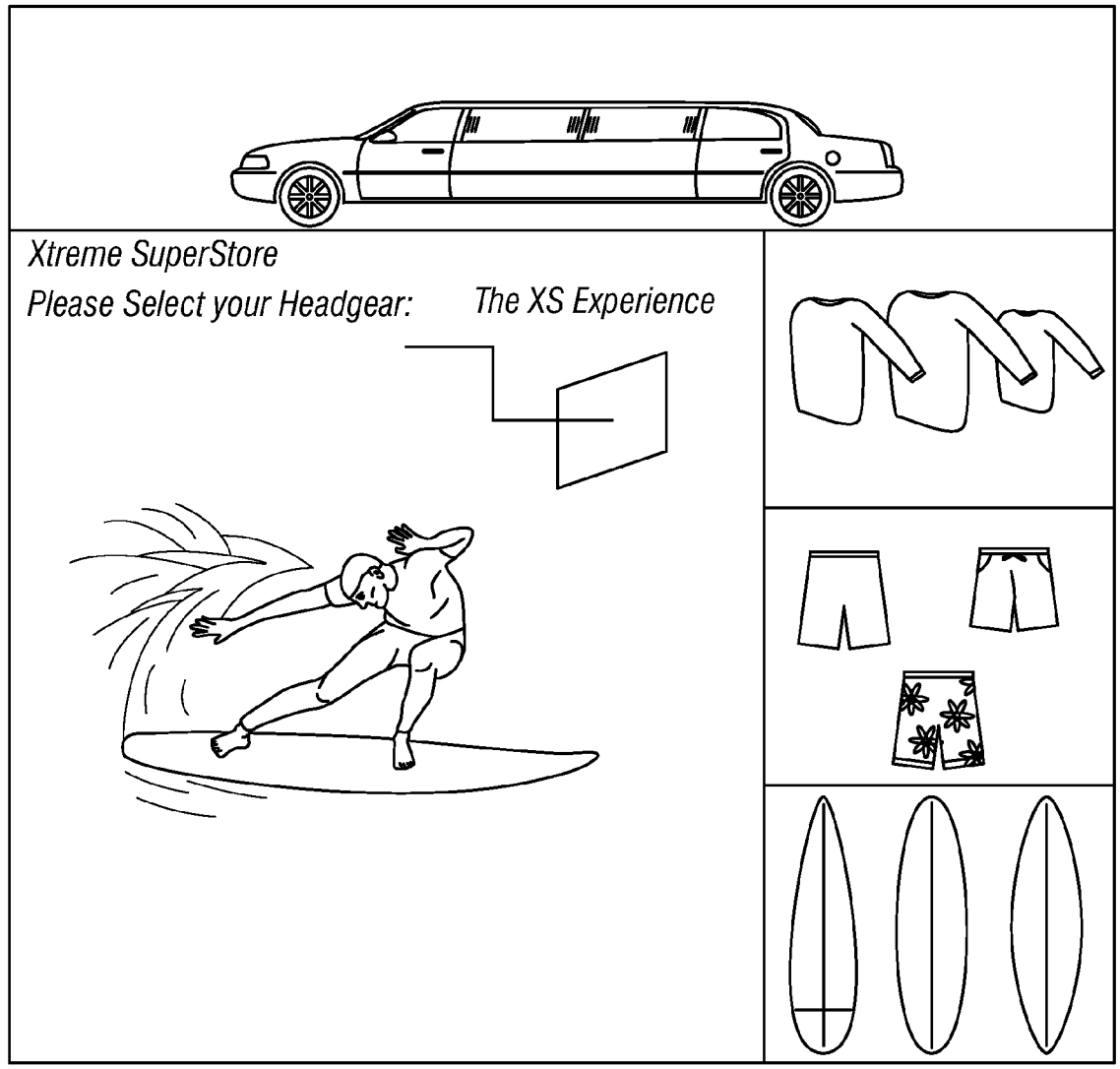
FIG. 5B is a screen display illustrating a user interface web page for selecting a series of fill images to be displayed within the primary image model.
Figure 5C:
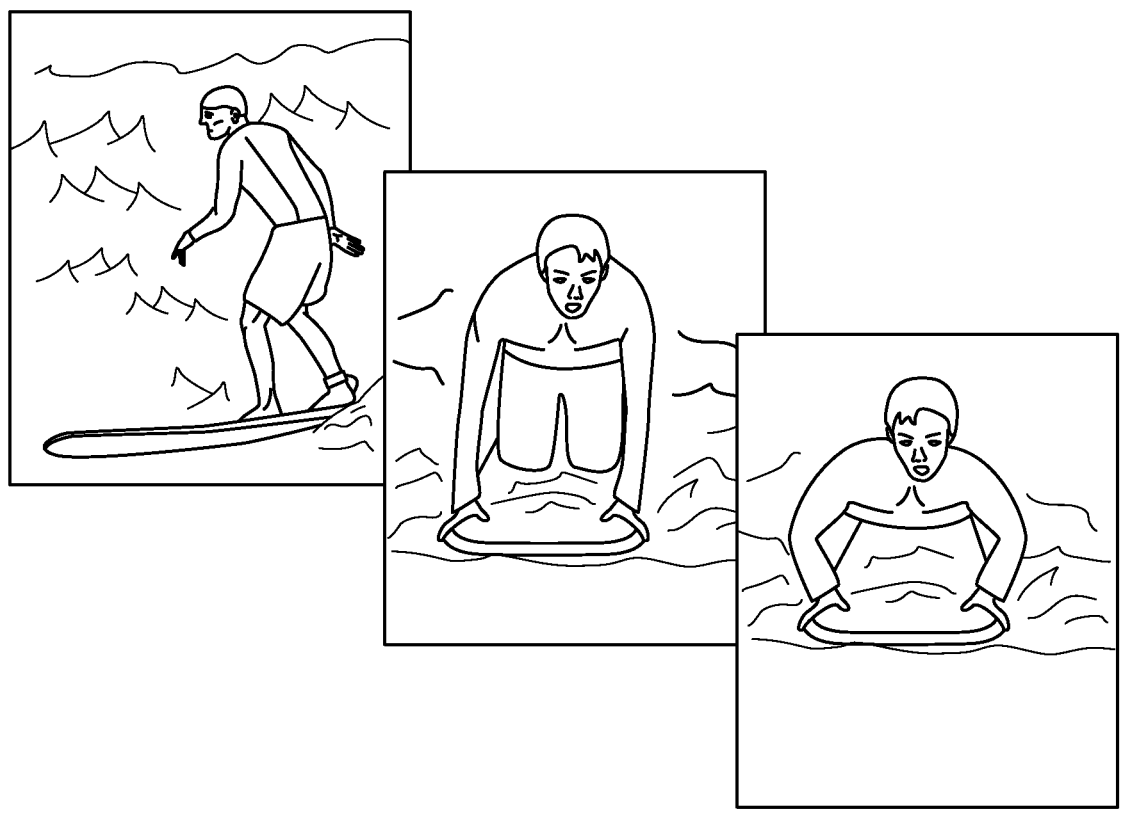
FIG. 5C is a screen display illustrating a presentation web page of the present invention.

For example, FIGS. 5A-5D depict a method and system where a user can view sporting equipment, such as surf boards and surf gear, and board shorts. In FIG. 5A, a user can chose from one of four athletes: a surfer, a skate boarder, a sky diver, or a wake boarder. If the user clicks on the surfer, the page depicted in FIG. 5B is delivered to the user's computer terminal. Now the user can chose one of among three wet suits, three board shorts, and three surf boards. The user can make his or her selections from among the displayed products, and a multi-media presentation of a surfer using those products is delivered to the user as shown in FIG. 5C. The multi-media presentation can be a sequence of still photographs, a video or film clip, or a sequence of computer generated images or digitized hand-drawn graphics.

Thus, in this example, the user can chose among twenty-seven different combinations of products to customize the multi-media presentation. The specifications, such as size and color, of each product can also be modified by the user during his or her customization of the multi-media presentation. Furthermore, the customized product or service can be viewed by the user in a virtual environment wholly or partially controlled by the user/consumer. The virtual environment can be a three-dimensional advertising sequence. For example, the user can direct the video or film clip in real-time by viewing it from different angles or perspectives, or by directing the movement of the surfer and instructing the surfer, for example, to do various tricks. The user can view this interactive advertising sequence from the perspective of an actor within the virtual environment. Or the user can view the advertising sequence from the perspective of an outsider.

This level of interaction, not only increases the amount of exposure that the user gets to the products being advertised, but makes the advertisement much more exciting and interesting. The modifications of the interactive advertisement will only be limited by the capabilities of the product in non-virtual real environments, thus allowing a consumer to be creative and enjoy the immersive advertising experience.

For example, these systems and methods enable a user/consumer to test drive a car chosen from a database of options, in a three-dimensional virtual environment. A graphical user interface will allow the remote user to control the direction and speed of the car as well as the virtual camera view position. Thus, the user can test drive the car from a behind the wheel view or from any position outside the car.

Another illustrative example involves interactive advertisements of medical and dental devices. In this example, a remote user can view an interactive advertisement of a dental drill, for example. The dental drill may contain options, and the remote user can assemble the drill from its component options to create a drill of choice. The remote user can then view the drill from any angle by using a graphical user interface that enables the user to view the drill from any virtual camera angle. The user can then actually use the dental drill in an interactive, three-dimensional, virtual environment. An advertising sequence can be provided from a database of advertising sequences. The user can control the advertising sequence by directing the virtual camera angle, the specifications of the product being advertised, choosing between different products, and directing the actions of virtual actors.

Figure 5D:
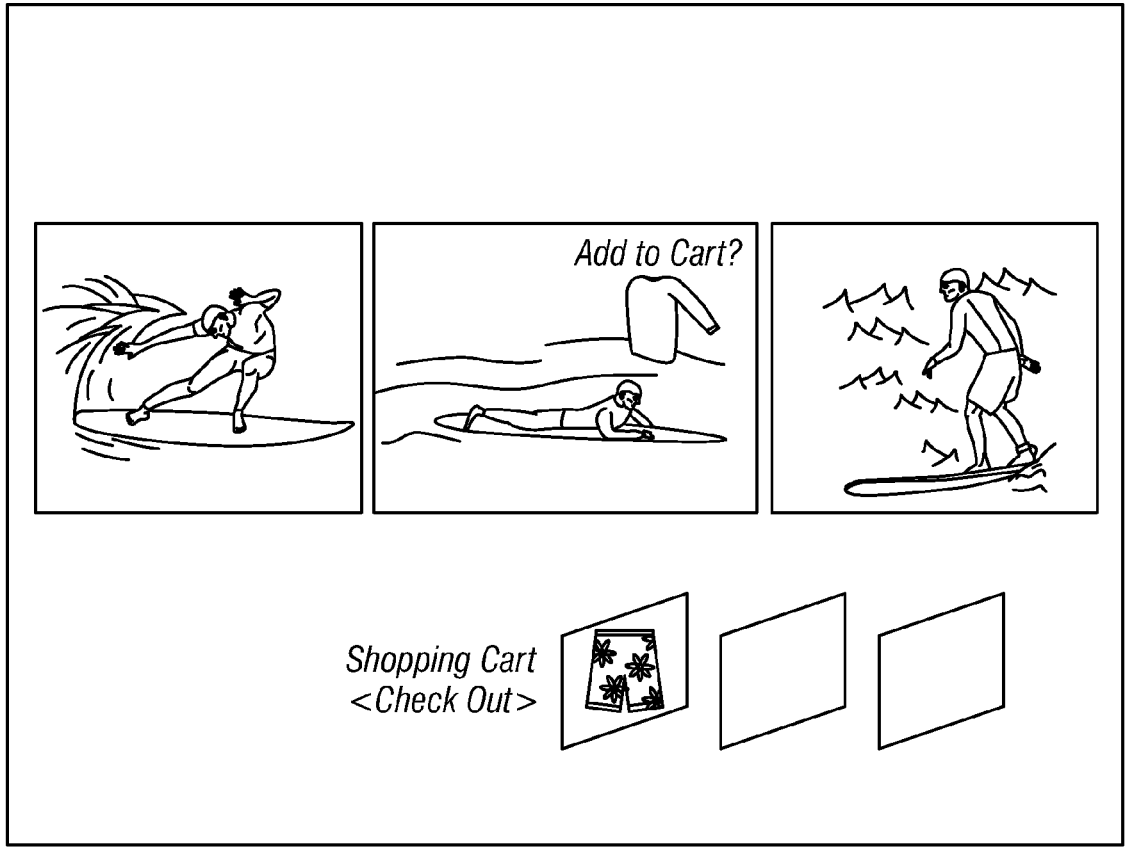
FIG. 5D is a screen display illustrating a user interface web page for selecting products to be purchased.

Then, as shown in FIG. 5D, the user can be offered the chance to purchase any or all of the products and services displayed in the interactive, multi-media presentation.

Figure 6A:
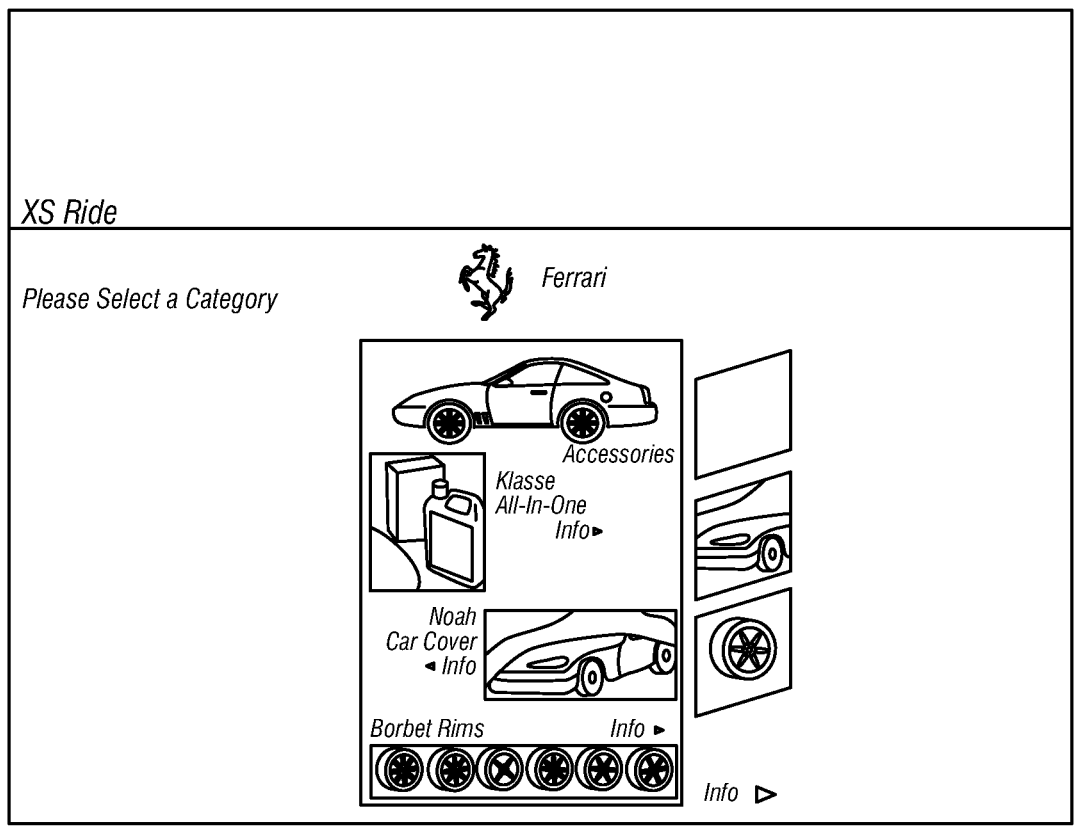
FIG. 6A is a screen display illustrating a user interface web page for obtaining additional information about related products.
Figure 6B:
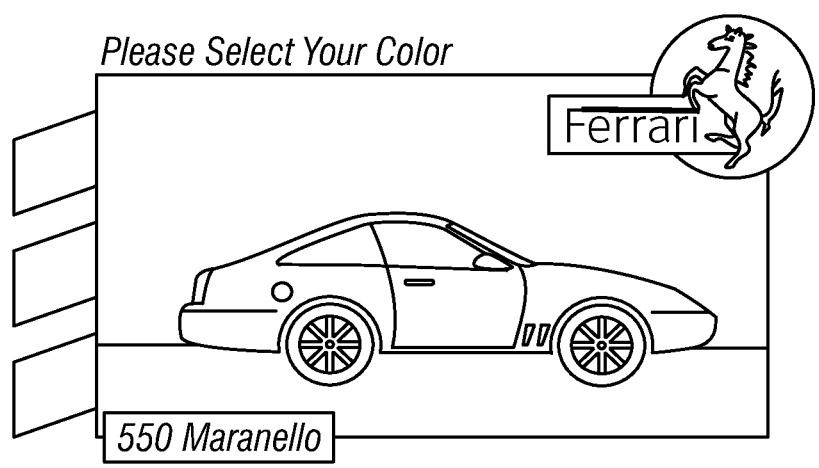
FIG. 6B is a screen display illustrating a user interface web page for selecting a dynamically altered image component that can serve as a fill image to be displayed within the primary image model.
Figure 6C:
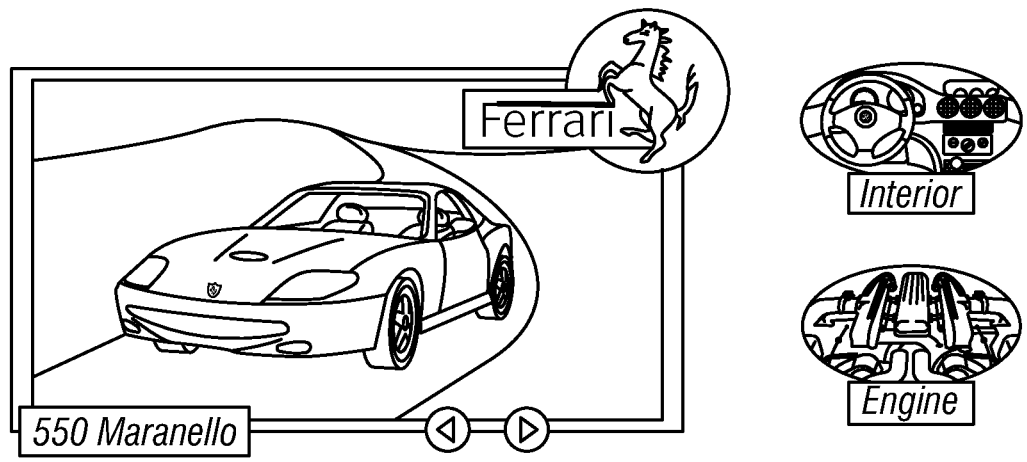
FIG. 6C is a screen display illustrating a presentation web page of the present invention.
Figure 6D:
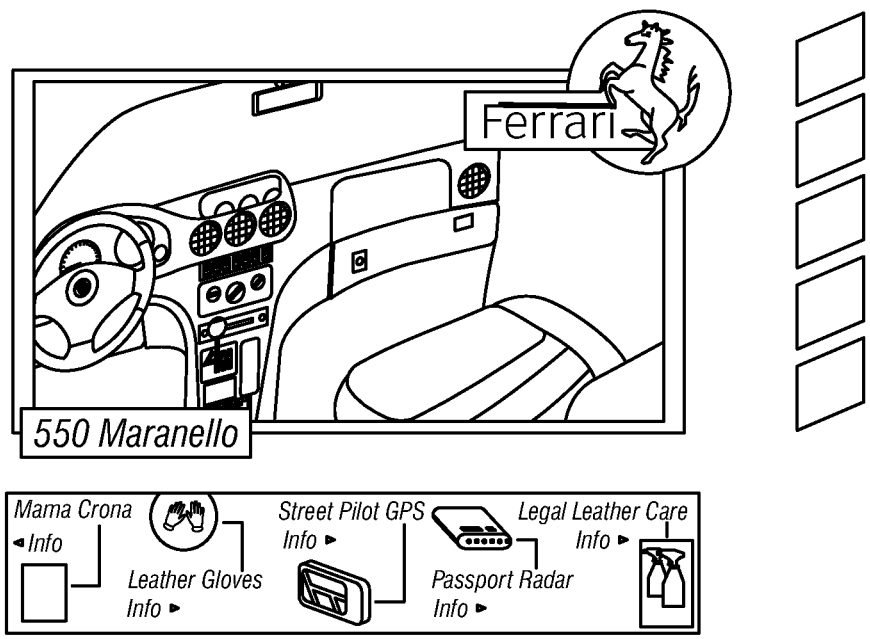
FIG. 6D is a screen display illustrating a presentation web page featuring a 360 degree image.

FIGS. 6A-6E show a method and system that enables a remote user/consumer to build his or her own car, and to then test drive it in a dynamic, virtual environment. In FIG. 6A, the user has already chosen a Ferrari (Registered trademark of Ferrari North America and Ferrari S.P.A.). Now the user/consumer can choose among a plurality of accessories, such as style of rims to place on the Ferrari. Then, as shown in FIG. 6B, which is an active server page, the user is given the opportunity to chose a color in which the car is offered; red, black or white. FIG. 6C shows that the user has chosen red, and is now given the opportunity to modify the interior of the car and the engine specifications of the car. If he clicks on "interior", he gets a closer look at the interior of the car (FIG. 6D), and can modify the interior specifications by clicking on one of the accessories provided beneath the photograph of the interior or by clicking on the desired component within the photograph of the interior. For example, he can click on the stereo, and be provided with a number of stereo options with which to modify his customized car. The modifications can be made in a dynamic setting enabled by an active server page.

Figure 6E:
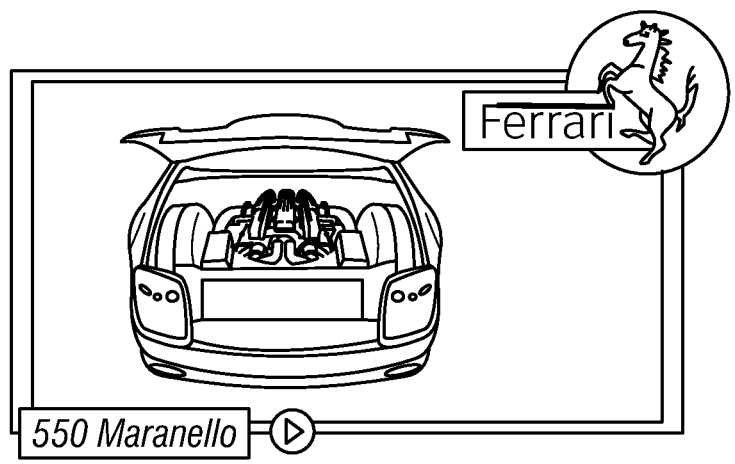
FIG. 6E is a screen display illustrating a presentation web page featuring a viewer movable component within the primary image model.

If the user/consumer clicks on "engine" in FIG. 6C, then the page shown in FIG. 6E will be delivered to the user's terminal. The user can zoom in on any component within the engine bay and dynamically remove that component and view it from any angle or perspective in real-time.

Finally, in an interactive multi-media presentation, the user is able to drive the car in one of a number of dynamic, virtual environments. The user can chose the virtual environment and then test drive the customized car as if he were in it and driving it himself. A graphical user interface is provided that enables the user to control the speed and direction of the car as well as the view or perspective from which the user views the interactive multi-media presentation of the car.

The methods and systems described herein can be used to advertise any product or service. Among them are clothing, shoes and accessories; cars and car products and accessories; motorcycles and motorcycle gear and accessories; watercraft; medical and surgical devices and instruments; cosmetics; household products; furniture; writing instruments; office supplies and equipment; sports equipment and gear; electronic equipment; scientific instruments; food items and recipes; tours of restaurants; and travel tours among other products and services not listed.

Although specific examples have been shown in the drawings and described in detail in the specification, the invention is susceptible to alternative forms and methods. Therefore, the invention is not limited to the particular forms or methods disclosed, but instead, covers all modifications, equivalents, and alternatives within the scope of the claims that follow.

The invention claimed is:

1. A computer system, comprising:
a computer which reads a primary model which represents a three dimensional version of an item which is controllable to allow viewing the item in three dimensions, and which also reads at least one filling part image for said primary model which shows an image of an item that is viewable separately from said primary model, wherein said computer uses said filling part image to fill in areas within said primary model to change said primary model to include said item, and where said primary model is viewable without said image of said item, and is also viewable with said filling part filled in to said primary model in a way that changes the look of the primary model;
wherein said computer system accepts inputs from a remote control area, and where said inputs control viewing the item from a plurality of different perspectives and which inputs select one of multiple filling parts to change the look of the primary model and also select at least one parameter for the item, where said parameter includes at least a color of the item, and responsive to said accepting the selection of a color, said system changes the look of the item to match a selected color.

2. A system as in claim 1, wherein said item is a vehicle and said model is a three dimensional model of the vehicle.

3. A system as in claim 1, wherein said filling part is an image of an accessory for said item.

4. A system as in claim 2, wherein said parameter is a color of a part of said vehicle.

5. A system as in claim 4, wherein said parameter represents a color of an exterior of the vehicle.

6. A system as in claim 4, wherein said parameter represents a color of an interior of the vehicle.

7. A system as in claim 6, wherein said computer system also accepts inputs representing an interior color of the vehicle, and automatically changes the interior color of the vehicle in said primary model.

8. A system as in claim 4, wherein said wherein said filling part is an image of an accessory for said vehicle.

9. A system as in claim 4, wherein said system allows selecting, using a graphical interface, an area within the vehicle, and showing different options for customizing said area.

10. A system as in claim 9, wherein said system customizes said area based on a selection.

11. A system as in claim 9, wherein said area is a stereo within the vehicle, which shows a number of different stereo options that can be used to customize the stereo and images of said different stereo options which are included as filling images within the primary model.

12. A system as in claim 9, wherein said system allows zooming to view at least one different items within the vehicle at a higher magnification and showing less of the vehicle when showing said higher magnification.

13. A system as in claim 12, wherein said zooming allows zooming into an engine compartment.

14. A system as in claim 2, wherein said system also allows virtual driving of the vehicle.

15. A system as in claim 14, wherein said system controls a simulated speed of the vehicle as part of said driving.

16. A system as in claim 14, wherein said system controls a simulated direction of the vehicle as part of said driving.

17. A method, comprising:
using a computer to combine a primary model which represents a three dimensional version of an item which is controllable to allow viewing the item in three dimensions with at least one filling part image for said primary model where said at least one filling part image shows an image of an item that is viewable separately from said primary model, wherein said computer uses said filling part image to fill in areas within said primary model to change said primary model to include said item, and where said primary model is viewable without said image of said item, and is also viewable with said filling part filled in to said primary model in a way that changes the look of the primary model;
receiving at least one input over a channel, said at least one input having multiple selections, and where said multiple selections control viewing the item from each of a plurality of different perspectives;
based on a first selection at a first time, viewing said item from a first perspective;
based on a second selection at a second time, viewing said item from a second perspective different than the first perspective;
based on a third of said inputs, selecting at least one parameter for the item, where said parameter includes at least a color of the item;
based on a fourth of said inputs, selecting one of multiple filling part images to change the look of the primary model; and
responsive to accepting the selection of the color and of said one of multiple filling part images, viewing said item in a color to match the selected color to have said part which includes a selected filling part image in said area in place of said area in said primary model.

18. A method as in claim 17, wherein said item is a vehicle and said base image is a three dimensional model of the vehicle.

19. A method as in claim 17, wherein said filling part is an image of an accessory for said item.

20. A method as in claim 18 wherein said parameter is a color of a part of said vehicle.

21. A method as in claim 18, wherein said parameter represents a color of an exterior of the vehicle.

22. A method as in claim 18, wherein said parameter represents a color of an interior of the vehicle.

23. A method as in claim 22, wherein said computer method also accepts inputs representing an interior color of the vehicle, and automatically changes the interior color of the vehicle in said primary model.

24. A method as in claim 20, wherein said wherein said filling part is an image of an accessory for said vehicle.

25. A method as in claim 20, wherein said method controls selecting, using a graphical interface, an area within the vehicle, and accepting options for customizing said area, and customizing said area based on a selection.

26. A method as in claim 25, wherein said area is a stereo within the vehicle, which shows a number of different stereo options that can be used to customize the stereo and images of said different stereo options which are included as filling images within the primary model.

27. A method as in claim 18, further comprising zooming into an engine compartment of the vehicle to see further details of the engine compartment.

28. A method, comprising:
using a computer to combine a primary model which represents a three dimensional version of an item which is controllable to allow viewing the item in three dimensions with at least one filling part image for said primary model where said at least one filling part image shows an image of an item that is viewable separately from said primary model, said using comprising directing said computer to use said at least one filling part image to fill in at least one respective area within said primary model to form a filling part image modified item;
receiving at least one input over a channel, said at least one input having multiple selections, and where said multiple selections control viewing the a filling part image modified item from each of a plurality of different perspectives;
based on a first selection at a first time, viewing said filling part image modified item from a first perspective;
based on a second selection at a second time, viewing said filling part image modified -item from a second perspective different than the first perspective; and
based on another of said inputs, directing an action of at least one virtual actor who interacts with said filling part image modified item.

29. A method as in claim 28, wherein said item is a vehicle.

30. A method as in claim 28, further comprising selecting a color.

* * * * *